Jan. 16, 1940.  E. O. SCHWEITZER, JR  2,187,180
ELECTRIC MOTOR CONSTRUCTION
Filed Aug. 6, 1938  4 Sheets-Sheet 1
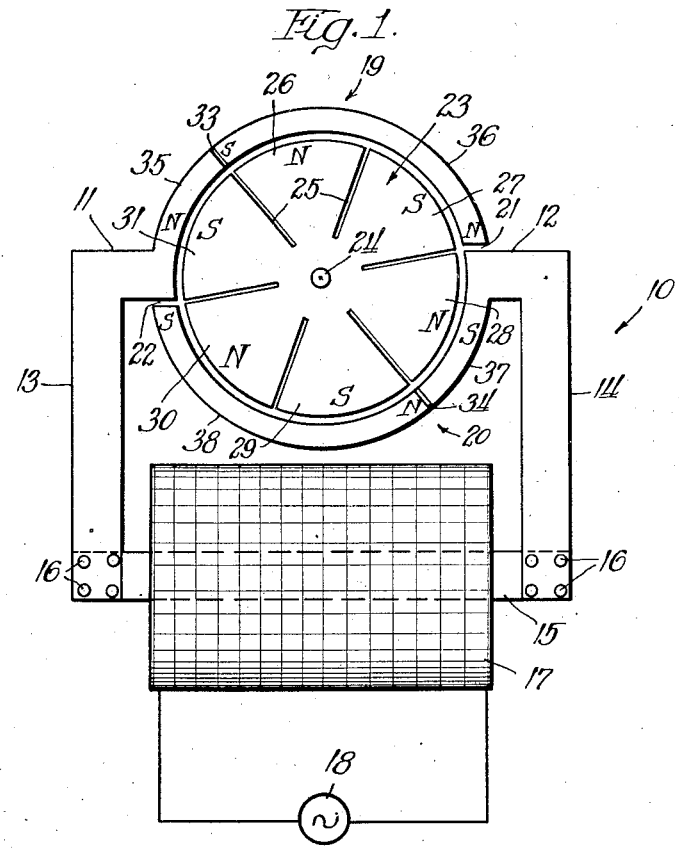
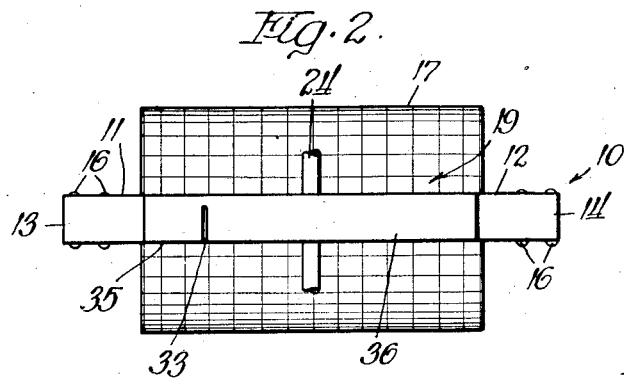
Inventor:
Edmund O. Schweitzer, Jr.
By Brown, Jackson, Boettcher & Dienner
Attys.

Jan. 16, 1940.  E. O. SCHWEITZER, JR  2,187,180
ELECTRIC MOTOR CONSTRUCTION
Filed Aug. 6, 1938   4 Sheets-Sheet 2

Inventor:
Edmund O. Schweitzer, Jr.
By Mann, Jackson, Boucher & Brenner
Attys

Jan. 16, 1940.  E. O. SCHWEITZER, JR  2,187,180
ELECTRIC MOTOR CONSTRUCTION
Filed Aug. 6, 1938  4 Sheets-Sheet 3

Inventor:
Edmund O. Schweitzer, Jr.
By Brown Jackson Boettcher-Dienner
Attys.

Jan. 16, 1940.  E. O. SCHWEITZER, JR  2,187,180
ELECTRIC MOTOR CONSTRUCTION
Filed Aug. 6, 1938    4 Sheets-Sheet 4
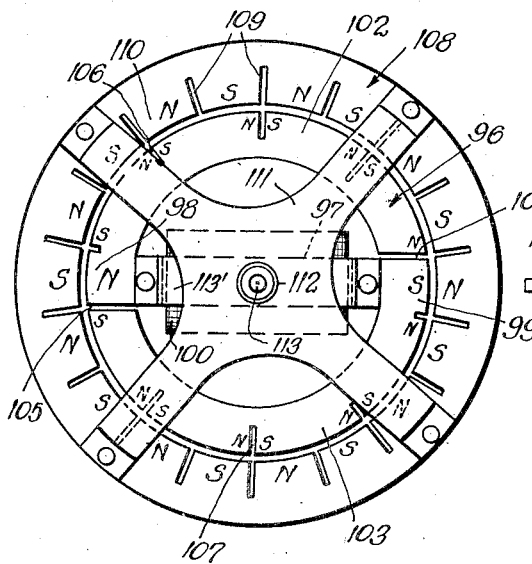
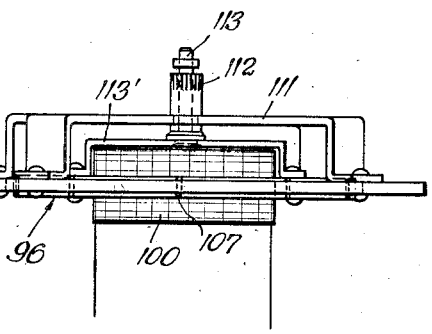
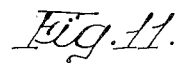
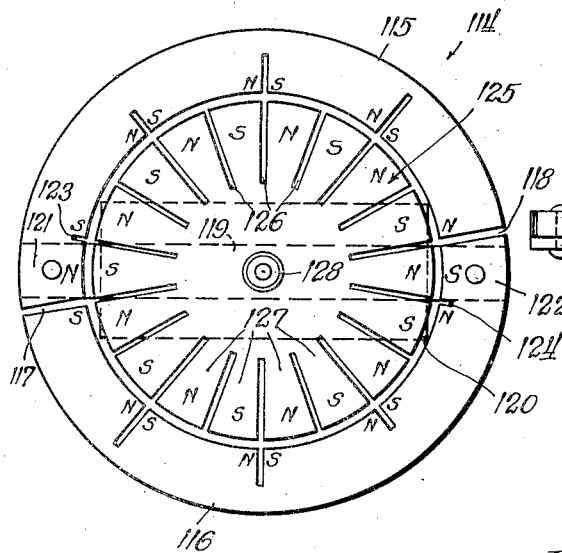
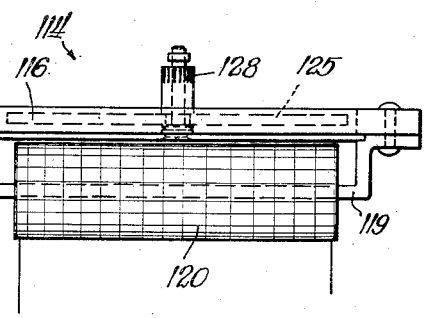
Inventor:
Edmund O. Schweitzer, Jr.
By
Brown, Jackson, Boettcher, Dienner
Attys.

Patented Jan. 16, 1940

2,187,180

UNITED STATES PATENT OFFICE 2,187,180

ELECTRIC MOTOR CONSTRUCTION

Edmund O. Schweitzer, Jr., Northbrook, Ill.

Application August 6, 1938, Serial No. 223,438

20 Claims. (Cl. 172—278)

My invention relates, generally, to electric motors and it has particular relation to self-starting synchronous single-phase alternating current motors adapted primarily for use in driving timekeeping apparatus, such as clock mechanisms, time switch mechanisms, and the like although it may be employed for other uses, as desired.

The present invention constitutes an improvement over the electric motor construction disclosed in my co-pending application, Serial No. 177,706, filed December 2, 1937. I have there illustrated and described a self-starting synchronous motor that is arranged to be energized from a single phase alternating current source. The shifting of the magnetic field for starting purposes is obtained without transferring the magnetic energy into electric energy and then back into magnetic energy, as is the case when shading coils are employed. The shifting of the magnetic field is effected by providing an extension from each pole toward the other pole of magnetic material, which causes the magnetic field to shift from each pole toward the other pole along the extensions to thereby cause a rotor positioned therebetween to rotate and to bring it up to a speed which is determined by the number of polar projections on the rotor in combination with the frequency of the alternating current source.

When a rotor having a number of polar projections greater than two is employed in the stator construction shown in my co-pending application, there is a tendency for it to rotate above the speed which is determined by the number of polar projections and the frequency of the alternating current source. For example, if the alternating current source operates at a frequency of 60 cycles per second, there is a tendency for the rotor to operate at a speed of 3600 revolutions per minute, rather than at a speed which is determined by the number of polar projections on the rotor, for example, at 900 R. P. M. for the 8-pole rotor or 1200 R. P. M. for a 6-pole rotor. In order to prevent the rotor from exceeding the desired synchronous speed, care must be taken in properly proportioning the field or stator structure and in the flux density that is employed for operating the motor.

Accordingly, an important object of the present invention is to provide a motor construction of the type shown in my co-pending application in which there is no tendency for the rotor to operate at a speed above that which is determined by the number of polar projections on the rotor and the frequency of the alternating current source.

An object of my invention is to provide for shifting an alternating magnetic field from one pole to another pole in a plurality of polar steps during each alternation.

Another object of my invention is to provide for shifting an alternating magnetic field from one pole to another pole in a plurality of polar steps during each alternation and for maintaining the intensity of the magnetic field in each polar step substantially the same.

Still another object of my invention is to increase the reluctance between successive arcuate sections of the stator of a single phase alternating current motor in order to shift the magnetic flux substantially uniformly in a plurality of polar steps during each alternation of the alternating magnetic field.

Another object of my invention is to provide for inducing a plurality of poles in a field structure energized with alternating magnetic flux during each alternation of the magnetic field.

A still further object of my invention is to provide as many polar steps in the stator of a motor energized from a single phase alternating current source as there are polar projections on the rotor, without converting magnetic energy into electric energy and then back into magnetic energy.

A further object of my invention is to prevent end thrust of the rotor of a motor of the type herein described by providing the maximum strength of the magnetic field in the plane in which it is intended that the rotor shall revolve.

A still further object of my invention is to so construct a single phase self-starting synchronous motor that the stator and rotor will be positioned in the same plane together with the operating winding in order to provide a construction having a minimum of thickness.

Other objects of my invention will, in part, be obvious and, in part, appear hereinafter.

My invention, accordingly, is disclosed in the embodiments thereof shown in the accompanying drawings, and it comprises the features of construction, combination of elements and arrangement of parts which will be exemplified in the constructions hereinafter set forth and the scope of the application of which will be indicated in the appended claims.

For a more complete understanding of the nature and scope of my invention, reference may be had to the following detailed description, taken in connection with the accompanying drawings, in which:

Figure 1 is a view in front elevation of one embodiment of the motor construction, the supporting structure for the rotor shaft being omitted;

Figure 2 is a top plan view of the motor shown in Fig. 1;

Figure 8 is a view in front elevation of another embodiment of the motor construction in which the rotor surrounds the stator, both the rotor and stator and the field winding being in the same plane;

Figure 9 is a view in top plan of the motor shown in Figure 8;

Figure 10 is a view, in front elevation, of another embodiment of the motor construction which is similar to that shown in Figure 8 and in which the rotor is positioned within the stator, the rotor and stator being in the same plane; and Figure 11 is a view, in top plan, of the motor shown in Figure 10.

Figure 3:
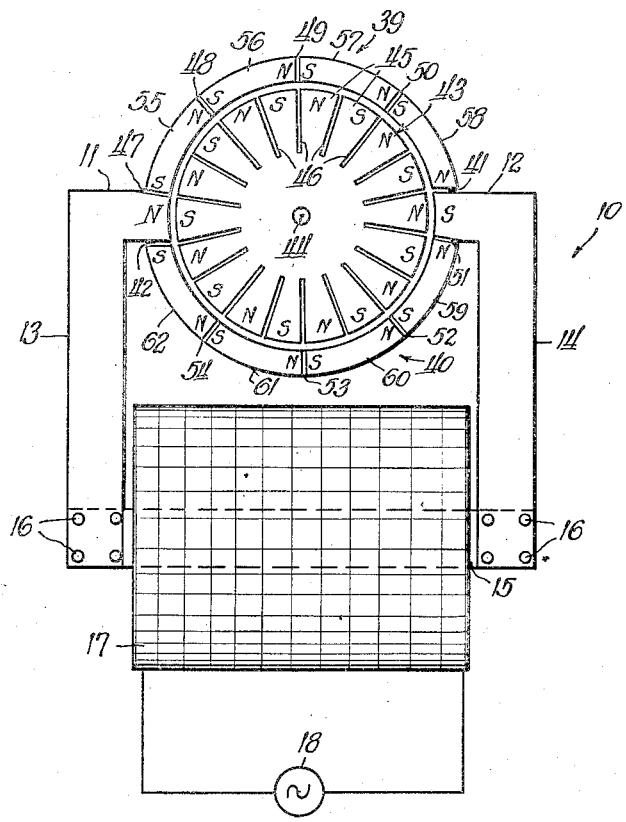
Figure 3 is a view in front elevation, similar to Figure 1, showing another embodiment of the invention.

Referring now particularly to Figures 1 and 2 of the drawings, it will be observed that the reference character 10 designates, generally, a stator which comprises a pair of oppositely positioned poles 11 and 12 at the ends of end legs 13 and 14 which are connected by an intermediate leg 15. Rivets 16 may be employed for securing the end legs 13 and 14 to the intermediate leg 15. It will be noted that the core structure comprising the end legs 13 and 14 and the intermediate leg 15 is generally C-shaped and that it has a winding or coil 17 on the intermediate leg 15 which may be connected to a source of alternating current indicated at 18, which may be a source of commercial frequency such as a 60-cycle source.

In order to provide a shifting field, polar extensions, shown generally at 19 and 20, are provided and, as shown, they extend from the poles 11 and 12, respectively. The polar extension 19 is spaced from the pole 12 by an air gap 21, while the polar extension 20 is spaced from the pole 11 by an air gap 22.

A rotor, shown generally at 23, is mounted for rotation on or with a shaft 24 between the poles 11 and 12 and the polar extensions 19 and 20. The rotor 23 is preferably formed of magnetic material, as is also the core structure of the stator 10, and the motor operates on the hysteresis principle. The rotor 23 is provided with a plurality of radial slots 25, in this embodiment six slots 25 being employed, in order to provide six polar projections 26 through 31 on the rotor 23.

With a view to shifting the magnetic field from each of the poles 11 and 12 during each alternation of the alternating current toward the other pole in a plurality of polar steps, so that there will be no tendency for the rotor 23 to rotate above the speed determined by the number of polar projections and the frequency of the alternating current source, in this case 1200 R. P. M., the polar extensions 19 and 20 are provided with slots 33 and 34, respectively, which extend substantial distances therethrough. The depth of the slots, for example the slot 33, is shown more clearly in Figure 2. Instead of slotting the polar extensions 19 and 20, an aperture may be drilled or punched or otherwise formed therein which will leave substantially the same cross-section of solid core as does each of the slots 33 and 34.

By providing the slots 33 and 34, the magnetic field is shifted from each pole 11 and 12 to the other pole during each alternation in a plurality of steps. For example, assuming that the instantaneous polarity of the poles 11 and 12 is as indicated, i. e., the pole 11 is a north pole and the pole 12 is a south pole, then the extreme end of the section 35 formed between the slot 33 and the pole 11 will be a north pole, and this will induce a south pole in the adjacent end of the section 36 of the remaining portion of the extension 19. In like manner, there will be a south pole at the extreme end of the section 37, formed between the slot 34 and the pole 12, which will induce a north pole in the adjacent end of the section 38 of the remaining portion of the polar extension 20. At the extreme end of section 36 a north pole will be formed and at the extreme end of section 38 a south pole will be formed. The instantaneous polarities of the rotor polar projections 26 through 31 will be as indicated, the even numbered polar projections being north poles and the odd numbers being south poles. This polar relationship of the rotor poles remains fixed during normal operation of the motor, while the polarities of the poles 11 and 12 are reversed during each half-cycle of the alternating current so that, while the polarities of the poles in the stator will be as shown for one half-cycle, they will be reversed during the next half-cycle. It will be observed that the south pole 31 is underneath the section 35 which constitutes a north pole while the rotor projection 26, which is a north pole, is underneath the south pole of the extension 36. At the same time, the rotor projection 27 is underneath the north pole of the extension 36. In the next half-cycle the pole 11 and section 35 become a south pole, while the poles at the ends of the section 36 are reversed. During this half-cycle the rotor 23 moves through an arc equal to the space occupied by one polar projection, in this case through 60 degrees, in accordance with the shift in the magnetic field of the stator. Because of the shifting magnetic field that is thus generated, the rotor 23 is caused to rotate as soon as the winding 17 is energized. As soon as the rotor 23 reaches its synchronous speed, i. e., 1200 R. P. M., there is no tendency for it to rotate above this speed because the number of polar steps through which the field in the stator is rotated corresponds to the number of polar projections, i. e., six, on the rotor 23.

The rule for determining the number of slots in the stator, such as the slots 21, 22, 33 and 34, required for a given number "N" of rotor slots is given by the formula—

Number of stator slots=½(N+2)

Since a 1200 R. P. M. motor rotor has six rotor polar projections, and therefore six slots, the number of stator slots required is—

(½(6+2)=4)

Thus, four slots, 21, 22, 33 and 34 are provided in the construction shown in Figure 1 for a six-pole rotor which operates at 1200 R. P. M.

It will be observed that this rule provides a magnetic pole in the stator for each polar projection on the rotor. It is because of this relationship that there is no tendency for the rotor, such as the rotor 23, to exceed the speed determined by the number of rotor polar projections and the frequency of the alternating current source, and to rotate at a speed, such as a speed of 3600 R. P. M., as is the case when the stator is provided with only two poles and is energized from a 60-cycle source.

I have found that the most suitable numbers of rotor slots are given by the series—

2—6—10—14—18—22—26—and so on

Figure 4:
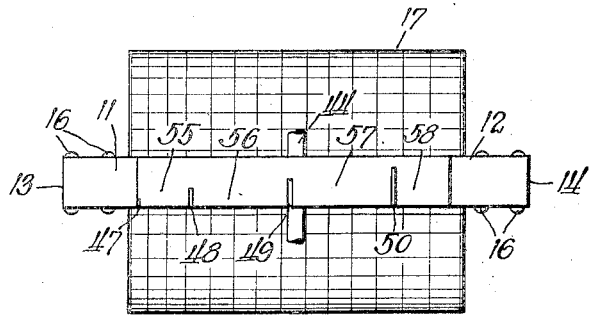
Figure 4 is a top plan view of the motor shown in Fig. 3.

The number of slots in the stator of a motor for operation at 400 R. P. M. from a single phase, 60-cycle source, is 10. A motor construction employing this number of stator slots is shown in Figures 3 and 4 of the drawings. The stator 10 there shown is generally similar to the stator 10 of Figure 1. The pole 11 is provided with a polar extension 39 and the pole 12 is provided with a polar extension 40, the polar extensions 39 and 40 being spaced from the poles 12 and 11 by air gaps 41 and 42, respectively. A rotor, shown generally at 43, is mounted for rotation on or with a shaft 44 and it is provided with a plurality of polar projections 45 which are spaced apart by radial slots 46. Since the motor of this embodiment is intended to rotate at 400 R. P. M., there are eighteen polar projections 45 and eighteen slots 46.

In order to provide a plurality of magnetic poles in each of the polar extensions 39 and 40 so that the magnetic field will be shifted in a plurality of polar steps during each alternation of the alternating current, the polar extension 39 is provided with a plurality of slots 47 through 50 and the polar extension 40 is provided with a plurality of similar slots 51 through 54. In the polar extension 39 the slots 47 through 50 form sections 55 through 58 at the ends of which poles are formed as indicated when the instantaneous polarity of the poles 11 and 12 is as indicated. Likewise, the slots 51 through 54 form sections 59 through 62 in the polar extension 40.

Since it is desirable to provide a substantially uniform distribution of the magnetic flux in each of the sections 55 through 62, the slots forming the same are made progressively deeper from each of the poles 11 and 12 toward the other pole. The reluctance of each of the reduced sections formed by the slots 47 through 54 is thus progressively increased until the maximum reluctance sections are provided by the air gaps 41 and 42. The different depths of the slots 47 through 50 is shown more clearly in Figure 4. Instead of employing transverse slots, as shown, suitable apertures may be drilled through the polar extensions 39 and 40, the diameter of each successive aperture away from each pole 11 and 12 being larger than the diameter of the preceding aperture. Obviously, the holes could be formed by punching, or otherwise.

In the construction of a 400 R. P. M. motor for operation from a 60-cycle source, it will be observed that each of the sections 55 through 62 correspond to a pair of polar extensions 45 of the rotor 43. The polarities of these polar extensions will be as indicated during operation of the motor, while the polarities of the magnetic poles at the ends of the sections 55 through 62 will be reversed during the next half-cycle from what they were during the preceding half-cycle.

The remaining two poles of the rotor 43 are individual to the poles 11 and 12, so that for each rotor polar projection 45 there is a corresponding magnetic pole in the stator. Since the magnetic poles of the stator change during each half-cycle, the rotor 43 is advanced during each half-cycle through an arc corresponding to the arcuate length of one rotor polar projection 45. In the case of a 400 R. P. M. motor this is 20 degrees.

Figure 5:
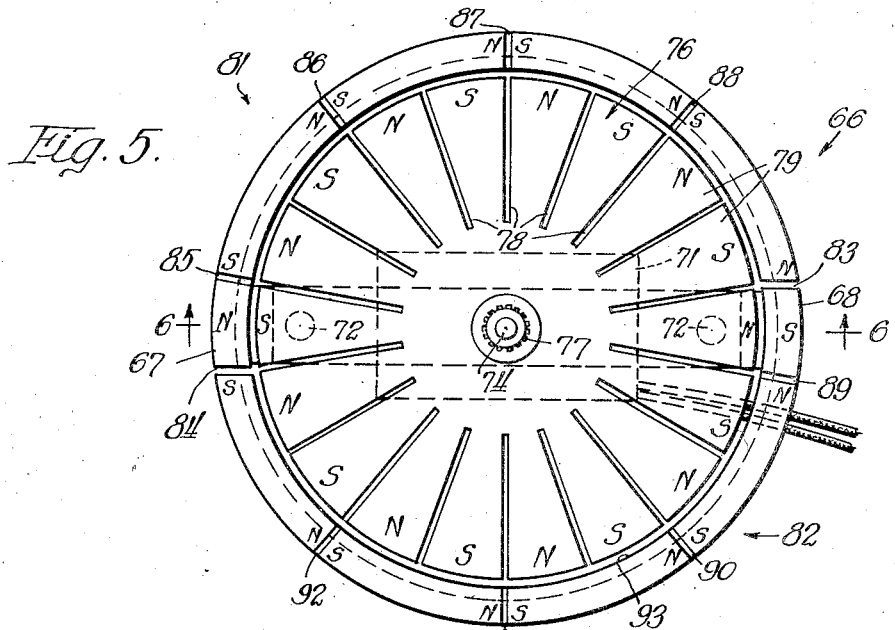
Figure 5 is a view in front elevation of another embodiment of the motor construction in which the field winding is positioned in a plane parallel to the plane of the stator and rotor.
Figure 6:
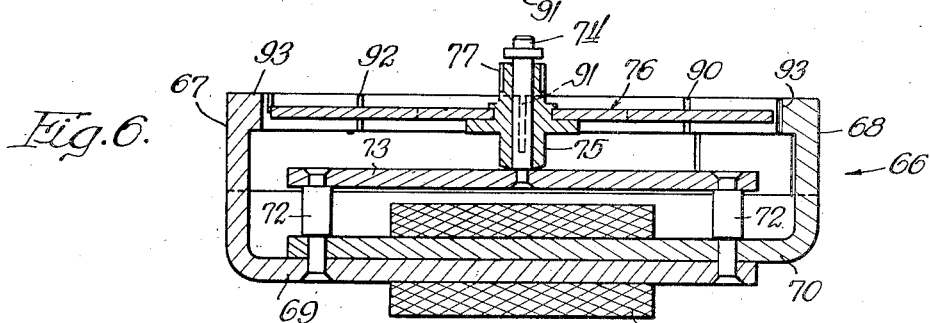
Figure 6 is a detail sectional view taken along the line 6—6 of Figure 5.
Figure 7:
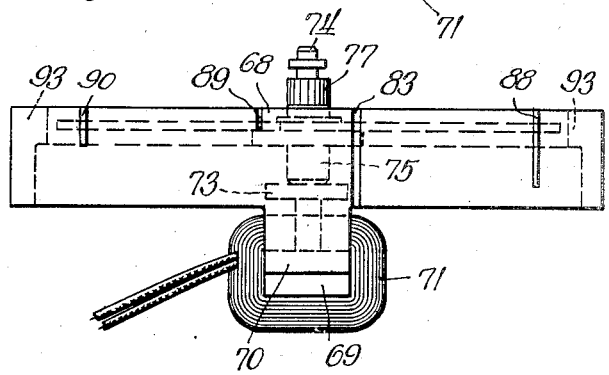
Figure 7 is a view in side elevation of the motor shown in Figure 5.

In Figures 5, 6 and 7 of the drawings I have illustrated a motor construction of the same general type as that shown in Figures 1 and 3 but in which the operating winding is positioned in a plane that is parallel to the plane of the rotor and stator so that the space required for the motor will be materially reduced. As shown, a stator, illustrated generally at 66, is provided having poles 67 and 68 at the ends of overlapping core members 69 and 70. A coil or winding 71 is positioned on the overlapping portions of the extensions 69 and 70 and may be connected to a suitable source of alternating current, such as a 60-cycle source as previously described. Rivets 72 serve to secure the extensions 69 and 70 together and also to support a plate 73, preferably formed of brass, which carries a spindle 74 on which a hub 75 is rotatably mounted. The hub has secured thereto a rotor, shown generally at 76, and is also provided with teeth 77 to provide a driving pinion. The rotor 76 is provided with a plurality of radial slots 78, in this case eighteen, to provide eighteen rotor polar projections 79.

With a view to shifting the magnetic field from each of the poles 67 and 68 toward the other pole, they are provided with polar extensions 81 and 82, respectively, which are spaced from the other poles by air gaps 83 and 84. Slots 85 through 88 and 89 through 92 are provided in the polar extensions 81 and 82 and are of increasing depth from each of the poles 67 and 68 for the purpose hereinbefore set forth.

It will be observed that the rotor 76 is formed by a thin disc. It is preferably formed of magnetic material. The metal parts making up the stator 66 are also preferably formed of magnetic material. With a view to insuring that the rotor 76 will rotate in a predetermined plane, thereby avoiding end thrust by the hub 75, the poles 67 and 68 and their polar extensions 81 and 82 are provided with an inwardly extending lip 93 which provides a concentration of the magnetic flux in the plane in which it is desired that the rotor 76 shall rotate. Since the rotor 76 tends to seek a position in which the maximum number of lines are interlinked, it will rotate in the plane of maximum flux concentration.

In Figures 8 and 9 of the drawings I have shown a motor construction employing the principles involved in the various embodiments described hereinbefore but which provides a further reduction in space required and at the same time facilitates the manufacture of the motor. As there illustrated, a stator, shown generally at 96, is provided and it is generally of S-shape. The intermediate leg 97 of the stator 96 is provided and poles 98 and 99 are formed at its ends on energization of the coil or winding 100 which may be connected to a suitable source of alternating current, such as a 60-cycle source. The pole 98 is provided with a polar extension 102 and likewise the pole 99 is provided with a polar extension 103. The polar extensions 102 and 103 are spaced from the poles 99 and 98 by air gaps 104 and 105, respectively. The polar extension 102 is provided with radial slots 106 of increasing depth from the pole 98 toward the air gap 104 and the polar extension 103 is likewise provided with radial slots 107 that increase in depth from the pole 99 toward the air gap 105 in order to provide for shifting the magnetic field during each alternation in a plurality of polar steps.

A rotor, shown generally at 108, is positioned around the stator 96. The rotor 108 is provided with a plurality of radial slots 109 thereby forming a plurality of inwardly extending rotor polar projections 110. In the embodiment of the invention illustrated there are eighteen slots 109, thereby forming eighteen rotor poles 110. The motor then operates at 400 R. P. M. when the coil or winding 100 is energized from a 60-cycle source. A bridging member 111, preferably formed of non-magnetic material such as brass, is secured to diametrically opposite points on the rotor 108, and carries a pinion 112 for driving a gear train, as will be readily understood.

It will be observed that the stator 96 and the rotor 108 are formed of plate-like magnetic material and that they are positioned in the same plane together with the coil or winding 100. The stator 96 and rotor 108 may be formed of suitable stampings and the various slots may be provided therein by a suitable punching operation. Obviously, the motor construction shown in Figure 8 requires a minimum of space and at the same time it is so arranged that the cost of production thereof is relatively slight and the steps required to form the same are comparatively simple.

In Figures 10 and 11 of the drawings another embodiment of the invention is illustrated that is somewhat similar to that shown in Figure 8. A stator, shown generally at 114 is provided which is formed in part by semi-circular portions 115 and 116 that are spaced apart by air gaps 117 and 118. The sections 115 and 116 are preferably formed of magnetic material and are joined at their ends by a magnetic bridging member 119 on which may be positioned a coil or winding 120 that may be connected to a suitable source of alternating current, such as a 60-cycle source. Poles 121 and 122 are formed at the ends of the bridging member 119 and the sections 115 and 116 constitute polar extensions therefrom. The section 115 is provided with radial slots 123 which increase in depth from the pole 121 toward the air gap 118. In like manner the section 116 is provided with radial slots 124 that increase in depth from the pole 122 toward the air gap 117.

Within the sections 115 and 116 a rotor, shown generally at 125, is mounted. The rotor 125 is provided with a plurality of radial slots 126, in this embodiment eighteen, in order to provide eighteen rotor polar projections 127. When the coil or winding 120 is energized from a 60-cycle source, the rotor 125 will rotate at 400 R. P. M.

By making the stator 114 and rotor 125 of plate-like material, such as laminations, and of the shapes indicated, it is possible to construct the motor principally by comparatively simple stamping operations.

Since certain further changes may be made in the foregoing constructions and different embodiments of the invention may be made without departing from the scope thereof, it is intended that all matter shown in the accompanying drawings or described hereinbefore shall be interpreted as illustrative, and not in a limiting sense.

I claim as my invention:

1. An electric motor comprising, in combination, a rotor forming a polar construction, a pair of pole members in spaced relation for cooperation with said rotor, means for generating a pulsating magnetic field between said pole members, a polar extension extending from each pole member along said rotor toward the other pole member, and means for successively inducing a plurality of poles in each polar extension during each pulsation, the number of poles corresponding to the number of poles of said polar construction.

2. An electric motor comprising, in combination, a rotor forming a polar construction, a pair of pole members in spaced relation for cooperation with said rotor, means for generating a pulsating magnetic field between said pole members, and a polar extension extending from each pole member along said rotor toward the other pole member, each polar extension having a plurality of reduced sections whereby said magnetic field is shifted from each pole member toward the other pole member in a plurality of definite polar steps during each pulsation, the reluctance of each section away from each pole member being greater than that of the preceding section.

3. An electric motor comprising, in combination, a rotor having magnetic material providing a plurality of rotor poles, a pair of stator poles at diametrically opposite sides of said rotor, means for generating an alternating magnetic field between said stator poles, a polar extension extending from each stator pole around said rotor toward and spaced from the other stator pole, and means for successively inducing a plurality of poles in each polar extension during each alternation, the number of poles corresponding to the number of rotor poles.

4. An electric motor comprising, in combination, a circular magnetic core having diametrically opposite air gaps, a magnetic bridging member interconnecting portions of said magnetic core adjacent said air gaps having its intermediate portion disposed in a plane substantially parallel to the plane of said circular magnetic core, winding means on said intermediate portion for connection to an alternating current source, and a rotor forming a polar construction rotatably mounted within said circular magnetic core.

5. An electric motor comprising, in combination, a circular magnetic core having diametrically opposite air gaps, a magnetic bridging member interconnecting portions of said magnetic core adjacent said air gaps having its intermediate portion disposed in a plane substantially parallel to the plane of said circular magnetic core, winding means on said intermediate portion for connection to an alternating current source, a rotor forming a polar construction rotatably mounted within said circular magnetic core, and means for successively inducing a plurality of poles in said circular magnetic core during each alternation of the magnetic field generated by said winding means, the number of poles corresponding to the number of poles of said polar construction.

6. An electric motor comprising, in combination, a circular magnetic core having diametrically opposite air gaps, a magnetic bridging member interconnecting portions of said magnetic core adjacent said air gaps having its intermediate portion disposed in a plane substantially parallel to the plane of said circular magnetic core, winding means on said core for connection to an alternating current source, a rotor forming a polar construction rotatably mounted within said circular magnetic core, and a lip extending radially inwardly from said circular magnetic core toward and spaced slightly from said rotor to provide a low reluctance path between said magnetic core and said rotor and thereby a flux concentration thereat for centering said rotor in a predetermined position.

7. An electric motor comprising, in combination, a rotor formed by a ring of electrically conducting material, a pair of stator poles at diametrically opposite positions inside said rotor, means for generating an alternating magnetic field between said stator poles, and only one polar extension extending from each stator pole along the inner periphery of said rotor toward and spaced from the adjacent side of the other stator pole whereby a magnetic circuit unsymmetrical with respect to each stator pole is provided.

8. An electric motor comprising, in combination, a rotor formed by a ring of magnetic material to provide a plurality of inwardly projecting rotor poles, a pair of stator poles at diametrically opposite positions inside said rotor, means for generating an alternating magnetic field between said stator poles, and only one polar extension extending from each stator pole along the inner periphery of said rotor toward and spaced from the adjacent side of the other stator pole whereby a magnetic circuit unsymmetrical with respect to each stator pole is provided, each polar extension having one or more reduced sections whereby said magnetic field is shifted from each stator pole toward the other stator pole in a plurality of definite polar steps during each alternation.

9. An electric motor comprising, in combination, a rotor formed by a ring of magnetic material to provide a plurality of inwardly projecting rotor poles, a pair of stator poles at diametrically opposite positions inside said rotor, means for generating an alternating magnetic field between said stator poles, a polar extension extending from each stator pole along the inner periphery of said rotor toward and spaced from the other stator pole, and means for successively inducing a plurality of poles in each polar extension during each alternation, the number of poles corresponding to the number of rotor poles.

10. An electric motor comprising, in combination, a rotor formed by a ring of electrically conducting material, a generally S-shaped stator of magnetic material inside said rotor and in the plane thereof, and winding means on the intermediate portion of said S-shaped stator for connection to a pulsating current source.

11. An electric motor comprising, in combination, a rotor formed by a ring of magnetic material to provide a plurality of inwardly projecting rotor poles, a generally S-shaped stator of magnetic material inside said rotor and in the plane thereof, winding means on the intermediate portion of said S-shaped stator for connection to a pulsating current source, and means for successively inducing a plurality of poles in each end portion of said S-shaped stator during each pulsation, the number of poles corresponding to the number of rotor poles.

12. An electric motor comprising, in combination, a rotor formed by a ring of magnetic material to provide a plurality of inwardly projecting rotor poles, a generally S-shaped stator of magnetic material inside said rotor and in the plane thereof, and winding means on the intermediate portion of said S-shaped stator for connection to a pulsating current source, each end portion of said S-shaped stator having one or more reduced sections for shifting the pulsating field generated by said winding from each end of said intermediate portion toward the other end of the same in a plurality of definite polar steps during each pulsation.

13. An electric motor comprising, in combination, a rotor formed by a ring of magnetic material to provide a plurality of inwardly projecting rotor poles, a generally S-shaped stator of magnetic material inside said rotor and in the plane thereof, and winding means on the intermediate portion of said S-shaped stator for connection to a pulsating current source, each end portion of said S-shaped stator having one or more reduced sections for shifting the pulsating field generated by said winding from each end of said intermediate portion toward the other end of the same in a plurality of definite polar steps during each pulsation, the reluctance of each section away from each end of said intermediate portion being greater than that of the preceding section, the number of rotor poles corresponding to the number of polar steps in each pulsation that the magnetic field is shifted.

14. An electric motor comprising, in combination, a rotor, a pair of pole members in spaced relation for cooperation with said rotor, means for generating a plusating magnetic field between said pole members, only one polar extension extending from each pole member along said rotor toward the adjacent side of the other pole member whereby a magnetic circuit unsymmetrical with respect to each pole member is provided, and means for successively inducing a plurality of poles in each polar extension during each pulsation of the magnetic field.

15. An electric motor comprising, in combination, a rotor, a pair of pole members in spaced relation for cooperation with said rotor, means for generating a pulsating magnetic field between said pole members, and only one polar extension extending from each pole member along said rotor toward the adjacent side of the other pole member whereby a magnetic circuit unsymmetrical with respect to each pole member is provided, each polar extension having a plurality of reduced sections whereby said magnetic field is shifted from each pole member toward the other pole member in a plurality of definite polar steps during each pulsation, the reluctance of each section away from each pole member being greater than that of the preceding section.

16. An electric motor comprising, in combination, a circular magnetic core having diametrically opposite air gaps which gaps impede the flow of magnetic flux peripherally in the core, a magnetic bridging member interconnecting portions of said magnetic core adjacent said air gaps having its intermediate portion disposed in a plane substantially parallel to the plane of said circular magnetic core, winding means on said intermediate portion for connection to an alternating current source, a rotor rotatably mounted within said circular magnetic core, and means for successively inducing a plurality of poles in said circular magnetic core during each alternation of the magnetic field generated by said winding means.

17. An electric motor comprising, in combination, a circular magnetic core having diametrically opposite air gaps which gaps impede the flow of magnetic flux peripherally in the core, a magnetic bridging member interconnecting portions of said magnetic core adjacent said air gaps having its intermediate portion disposed in a plane substantially parallel to the plane of said circular magnetic core, winding means on said intermediate portion for connection to an alternating current source, a rotor rotatably mounted within said circular magnetic core, and a lip extending radially inwardly from said circular magnetic core toward and spaced slightly from said rotor to provide a low reluctance path between said magnetic core and said rotor and thereby a flux concentration thereat for centering said rotor in a predetermined position.

18. An electric motor comprising, in combination, a rotor formed by a ring of magnetic material, a pair of stator poles at diametrically opposite positions inside said rotor, means for generating an alternating magnetic field between said stator poles, and only one polar extension extending from each stator pole along the inner periphery of said rotor toward and spaced from the adjacent side of the other stator pole whereby a magnetic circuit unsymmetrical with respect to each pole member is provided, each polar extension having one or more reduced sections whereby said magnetic field is shifted from each stator pole toward the other stator pole in a plurality of definite polar steps during each alternation.

19. An electric motor comprising, in combination, a rotor in the form of a ring, a pair of stator poles at diametrically opposite positions inside said rotor, means for generating an alternating magnetic field between said stator poles, and only one polar extension extending from each stator pole along the inner periphery of said rotor toward and spaced from the adjacent side of the other stator pole whereby a magnetic circuit unsymmetrical with respect to each pole member is provided, said rotor, stator poles and polar extensions being disposed in the same plane.

20. An electric motor comprising, in combination, a rotor in the form of a ring, a pair of stator poles at diametrically opposite positions inside said rotor, means for generating an alternating magnetic field between said stator poles, and only one polar extension extending from each stator pole along the inner periphery of said rotor toward and spaced from the adjacent side of the other stator pole whereby a magnetic circuit unsymmetrical with respect to each stator pole is provided, each polar extension having one or more reduced sections whereby said magnetic field is shifted from each stator pole toward the other stator pole in a plurality of definite polar steps during each alternation, the reluctance of each section away from each stator pole being greater than that of the preceding section.

EDMUND O. SCHWEITZER, Jr.